No. 864,840. PATENTED SEPT. 3, 1907.
R. E. FRICKEY.
APPARATUS FOR ELECTRICALLY REMOVING AND SEVERING METAL.
APPLICATION FILED JUNE 29, 1906.
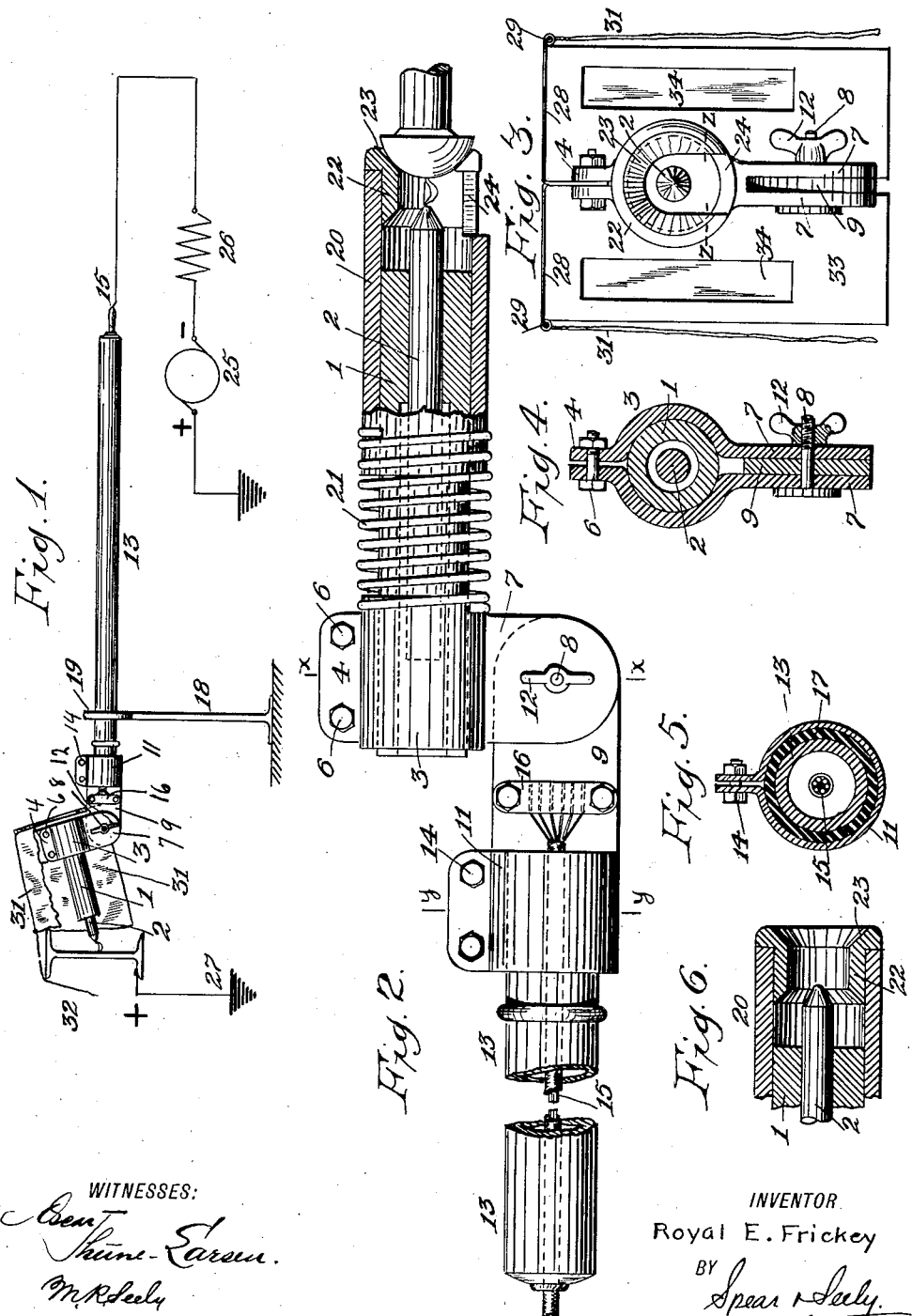
WITNESSES:
INVENTOR
Royal E. Frickey
BY
ATTORNEYS

UNITED STATES PATENT OFFICE.

ROYAL E. FRICKEY, OF BERKELEY, CALIFORNIA.

APPARATUS FOR ELECTRICALLY REMOVING AND SEVERING METAL.

No. 864,840.　　　　　Specification of Letters Patent.　　　　Patented Sept. 3, 1907.

Application filed June 29, 1906. Serial No. 324,025.

*To all whom it may concern:*

Be it known that I, ROYAL E. FRICKEY, a citizen of the United States, residing at Berkeley, in the county of Alameda, State of California, have invented certain new and useful Improvements in Apparatus for Electrically Removing and Severing Metal, of which the following is a specification.

My invention relates to an apparatus or machine for electrically removing, cutting or severing metallic structures, parts or pieces, such as beams, girders, rivets and metal work in general. It is however particularly adapted to what may be called wrecking operations. For example, after the destruction of a building wholly or partly constructed of iron or steel, such structural work often forms a tangled mass on the ground which is very difficult to remove. At present when it is necessary to cut a beam or girder in order to remove it, hack saws or chisels of various kinds are employed, involving a long, slow and laborious operation.

The object of my invention is to make it possible to remove parts of metal, or to cut into or sever metallic pieces and to destroy rivet heads in a much more expeditious manner, and at much less expense than by the means commonly employed heretofore. I accomplish this by means of an apparatus in an electric circuit and by utilizing the heat of an electric arc between the metal to be operated upon and an electrode carried by the apparatus.

An embodiment of my invention is shown in the accompanying drawings.

Figure 1 is a side elevation of an apparatus in the form in which I prefer to use it for acting upon structures such as beams or girders; Fig. 2 is an enlarged elevation partly in section, showing certain additions to Fig. 1, which adapt the machine more particularly to the destruction or removal of rivet heads or rivets, and for reaming out holes, when desired. Fig. 3 is an end elevation looking from the left of Fig. 1, the front curtain of the screen or hood being removed; Fig. 4 is a cross section on the line $x$—$x$ of Fig. 2; Fig. 5 is a cross section on the line $y$—$y$ of Fig. 2; Fig. 6 is a horizontal section, looking from below, taken on the line $z$—$z$ of Fig. 3.

At 1 is represented a tubular holder for an electrode, which holder is made preferably of graphite and whose internal bore is of two diameters, one of which snugly fits the electrode 2, while the other is considerably larger than the said electrode. The short bearing shown is sufficient to support the electrode, while the enlarged part of the bore facilitates its insertion. The contact between the electrode and the graphite holder also provides sufficient conducting surface from the metallic parts to be described and the electrode which is preferably also made of graphite can be moved forwardly in the holder whenever reduction of its length renders such adjustment necessary or desirable.

Surrounding the rear end of the holder is a clamp 3, having upwardly extending flanges 4 to receive clamping bolts 6, and downwardly extending wings 7. Between these wings is hinged, by means of a screw threaded bolt 8, which passes through the three parts, a forward extension 9 of the handle clamp 11. A butterfly nut 12 affords a convenient means for tightening the joint and producing friction enough to retain such joint in any position, to which it has been adjusted. Within the socket formed by the clamp 11, is inserted a handle 13, upon which the clamp is tightened by bolt 14. This handle may be made of any suitable material and may be either solid or hollow. I have illustrated it as hollow in order to show how the electrical conductor 15 can be carried through it and connected as a terminal to a metallic part of the apparatus as shown at 16. If a solid handle be used the conductor would of course lead from the outside to the terminal clamp 16. If a non-conducting material be used for the handle, whether solid or hollow, as bamboo, no insulation is necessary; but if a metal handle of either character be employed, it should be insulated from the metal parts of the apparatus, and for that purpose an insulating bushing 17 is shown in Fig. 5.

Any suitable support or guide may be employed for the apparatus. I have shown a simple standard 18 having a fork 19 at its upper end in which the handle rests and in which the operator can move such handle forward and back or turn it sidewise in either direction to any extent.

The machine, as thus far described, is adapted to operate upon such structures as the I-beam shown in Fig. 1. In working upon rivet heads I provide certain additional parts attachable to and detachable from the construction of Fig. 1. Figs. 2, 3 and 6 show such additions. The holder 1 is surrounded by a snugly fitting but freely movable sleeve 20 of refractory material, preferably a magnesia composition, and between the clamp 3 and said sleeve is a spring 21. The sleeve projects beyond the end of the electrode. As the heat is intense near the end of the sleeve I protect the latter by inserting within it a flanged thimble 22, preferably of the same material as the sleeve, and which has an inwardly beveled mouth 23, and a slot or opening 24 to permit molten metal to escape. This shape of the end of the sleeve fulfils the two-fold purpose of centering the electrode in proper relation to the rivet, and of concentrating the heat in the closed chamber formed by the thimble and rivet head. The sleeve, thimble and spring are removable from and attachable to the holder, and the thimble is independently removable from the sleeve.

The electrical connections can be exceedingly simple. I prefer to use a direct current dynamo as shown at 25, but it will be understood that an alternating current dynamo can be used in conjunction with suitable transformers. The minus side of the circuit contains a resistance coil 26 which is partly to reduce the voltage to the proper degree for efficient operation and partly to ballast the circuit and maintain the substantial steadiness of the arc. This side of the circuit goes to the terminal 16 on the apparatus. The plus side of the circuit may be grounded as shown. If the beam or other metal, or the mass of metal of which it forms a part, has a good ground connection, a circuit normally open at the point of operation, is completed through such ground. Otherwise a special ground can be made at the plus terminal as illustrated at 27 in Fig. 1. Of course an actual conductor can be carried to or connected with the beam at the point of operation. Preferably this is always the terminal of the plus side of the circuit, it being well known that the positive electrode of an established arc,—in this case the metal being acted upon is of higher temperature than the negative electrode.

In using the apparatus the operator, by moving the handle, causes the electrode to make contact with the metal so as to close the circuit. The electrode is then slightly withdrawn and the arc established. Then by proper movements of the electrode the intense heat of the arc will burn rivet heads and rivets and sever metallic pieces such as structural members with great rapidity.

As the intense heat of the arc is accompanied by intense light, I prefer, for the protection of workmen and bystanders, to provide the machine with an incombustible hood or curtain, preferably of an asbestos fabric. Such a screen is shown in Figs. 1 and 3. A wire frame having angular arms 28 is secured to the apparatus, the clamp 3 being a convenient location. To these arms are secured side rods 29, from which hang side curtains 31, and from the forward end of which a front curtain 32 is dropped over the beam as shown in Fig. 1. A rear curtain 33 is also shown which is preferably provided with windows 34 of mica or other suitable material.

The manipulation of the device when used in the form shown in Fig. 2, differs only in that the operator forces the sleeve 20 against the metal, causing said sleeve to yield backwardly against the pressure of spring 21, and allowing the electrode to close the circuit. By decreasing the pressure the sleeve is permitted to move forward relatively to the electrode until the arc is established.

I do not limit myself to the specific constructions herein described and shown in the drawing, as I desire to avail myself of such modifications and equivalents as fall properly within the spirit of my invention.

What I claim is:—

1. In an apparatus for the described purpose, an electrode, and a graphite holder for the same having an interior bore of two diameters.

2. In an apparatus for the described purpose, an electrode, a tubular electrode holder of graphite to receive said electrode, and an external sleeve of refractory material.

3. In an apparatus for the described purpose, an electrode, a surrounding electrode holder, an external sleeve of magnesia composition and a refractory thimble adapted to fit the end of said sleeve and to be removed therefrom.

4. In an apparatus for the described purpose, an electrode, a surrounding electrode holder, an external sleeve of magnesia composition and a slotted thimble removable from the end of said sleeve.

5. In an apparatus for the described purpose, an electrode, an electrode holder surrounding the same, an external refractory sleeve, and a thimble removable from said sleeve and having a beveled mouth.

6. In an apparatus for the described purpose, a metallic clamp, an electrode holder therein, a refractory sleeve surrounding a portion of the length of said holder and having an internally beveled end and a spring between said clamp and said sleeve.

7. In an apparatus for the described purpose, an electrode holder having a bore to receive an electrode, an electrode in such holder projecting beyond it, and a removable yielding sleeve of refractory material surrounding said holder and extending beyond the electrode.

8. In an apparatus for the described purpose, a tubular holder, an electrode therein adapted to project beyond the end of said holder, a sleeve of refractory material surrounding the said holder and extending beyond said electrode, and a tip or thimble at the end of said sleeve; the tip and sleeve being removable from the holder and the tip being independently detachable from the sleeve.

In testimony whereof I have affixed my signature in presence of two witnesses this 8th day of June, 1906.

ROYAL E. FRICKEY.

Witnesses:
L. W. SEELY,
M. R. SEELY.